Dec. 13, 1932.  R. C. OSTERSTROM  1,891,106
METHOD OF POLYMERIZING UNSATURATED HYDROCARBON OILS
Filed Dec. 31, 1928
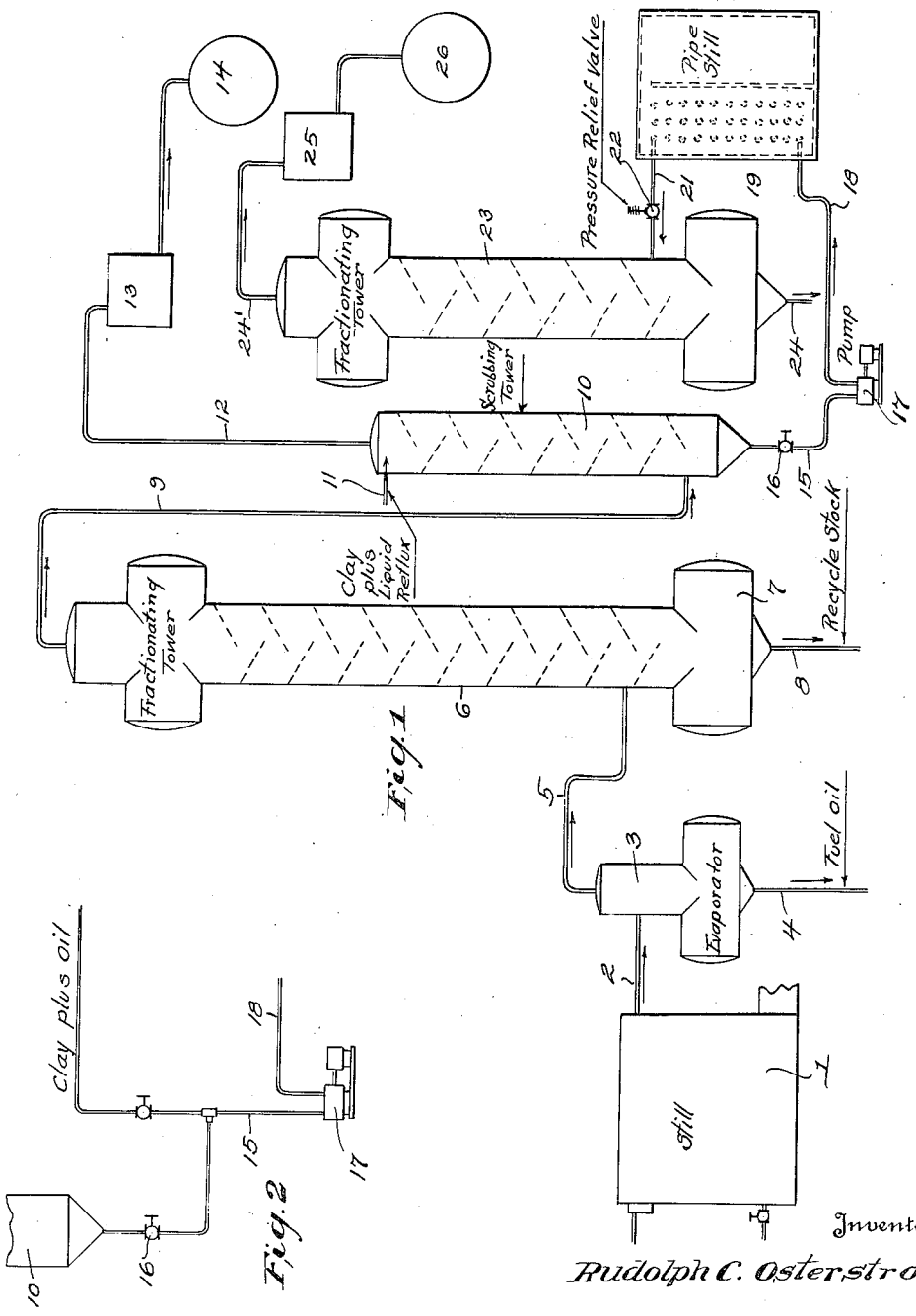
Inventor
Rudolph C. Osterstrom
By W. S. McDowell
Attorney Patented Dec. 13, 1932

1,891,106

UNITED STATES PATENT OFFICE

RUDOLPH C. OSTERSTROM, OF CHICAGO, ILLINOIS, ASSIGNOR TO THE PURE OIL COMPANY, OF CHICAGO, ILLINOIS, A CORPORATION OF OHIO

METHOD OF POLYMERIZING UNSATURATED HYDROCARBON OILS

Application filed December 31, 1928. Serial No. 329,417.

This invention relates to an improved process of treating hydrocarbons containing substantial quantities of unsaturated compounds to an improved operation adapted to separate from said hydrocarbons compounds of an undesirable character, or those which tend to discolor the end products or produce gum substances therein.

It is customary in the treating of hydrocarbons for color and gum removal to pass hydrocarbon vapors through beds of filtering material composed of fuller's earth or other equivalent materials. During the passage of the vapors through the fuller's earth reactions take place wherein the undesirable constituents of the oil vapor under treatment are to a certain extent at least polymerized, the polymerized fractions producing a liquid which may be removed from the treating apparatus separately as regards the more desirable constituents, which remain in vapor formation after passing through the treating material and may be subsequently suitably condensed and utilized.

In a process of this type, the fuller's earth towers are ordinarily maintained at an internal temperature of approximately 250° F. At this temperature with certain types of distillates there is a very considerable amount of condensation and a comparatively small amount of vapor. Under these conditions and at the temperature specified, at relatively low pressures, say 15 pounds per square inch, the clay or fuller's earth has but short life in the treating of hydrocarbon distillates suitable for motor fuels. Tests have disclosed that under the conditions specified a maximum yield per ton of clay has been between 9 to 12 barrels of a liquefied and purified end product. In such a treating process there is a large amount of condensation, and the poor yields from the total quantity of clay used has been thought to be due to the fact that this excessive condensation blocks off to a large extent the grain cells of the clay or fuller's earth so that the latter can not get in its full catalytic action on the vapors under treatment. Again, the probabilities are that there is but a small quantity of vapor in the process under treatment and, therefore, the poor results are largely attributable to the low temperatures which prevail in the clay towers.

To overcome these conditions and to improve the economic state of the system by enabling more hydrocarbon distillate to be treated per ton of fuller's earth employed, I have found that the higher the temperature of the vapors under purification the more effective will be the treating material and also its life will be considerably prolonged. For example, I have determined that when treating certain types of distillates, that by raising the internal temperature of the clay tower to approximately 300° F. I am able to secure between 50 to 100 barrels of a purified and liquefied distillate per ton of treating material. On raising the temperature to 350° F. the yield increases to about 200 barrels of finished distillate to each ton of treating material.

It is therefore an outstanding object of the present invention to employ high vapor temperatures at the time said vapors are being treated with the contact material. It is another object of the invention to provide for improved contact between the catalytic or treating material and the vapors under treatment. In the ordinary form of treating apparatus, as above described, the oil vapors are permitted to percolate through a stationary bed of fuller's earth. It has been found that in practical operation the vapors tend to channel through the fuller's earth bed, that is, small passages are produced through the filtering material which permit the vapors to pass quickly therethrough but without proper contact with the filtering material. The present invention provides for improved contact by introducing the treating material into a pipe line, or other enclosed member, through which the oil vapors under treatment are passed or circulated, whereby said treating material is thoroughly intermingled with the oil vapors while traveling in unison with the latter and in the form of a vaporous flow stream so that complete and effective contact will take place between the treating materials and the oil vapors, or liquid oil. Fine mesh treating material is preferably utilized, that is, material which will pass through a 200 mesh wire screen, at least.

A further object of the invention resides in passing the commingled treating material and oil through a pipe still, or other heating unit, wherein said oil is vaporized and brought to a temperature of approximately 200 pounds per square inch while the hydrocarbons are maintained in substantially the vapor phase. This results in securing the desired intimacy of contact between said treating material and the hydrocarbons, the requisite high temperature and, therefore, securing the desired polymerization rate of the undesirable compounds. Following the heating of the vapors and the contact material, the mixture is passed through a pressure reduction valve and is admitted into a fractionating column under reduced pressure. In this fractionating column there takes place separation of the undesirable polymerized compounds from the desirable compounds, the latter remaining in a vaporous state and passing from the fractionating column for condensation and storage, the heavier liquefiable polymerized compounds and treating material being collected in the bottom of the fractionating column where they may be separately and permanently withdrawn from the system.

The fuller's earth or other equivalent substance, which I use in carrying out the invention, may be in the nature of a contact material or it may act as a catalyst for promoting polymerization reactions, or it may be in the nature of an adsorbent. Regardless of its form of operation it remains, however, an established fact that polymerization of the undesirable compounds is accelerated when the fuller's earth is present. Further, the more intimate the contact between the materials under treatment and the fuller's earth and the higher the working temperature the more effective and economical the operation of the system becomes.

The ordinary fuller's earth tower, as hereinbefore explained, provides a bed of fuller's earth which may be used for a certain period of time. When exhausted the operation of the tower must be curtailed and the spent earth removed and a fresh quantity substituted in place thereof. In accordance with the present invention the operation of the system is uninterrupted and continuous and, moreover, a greater degree of uniformity is obtained for the reason that fresh fuller's earth in proper quantities is being continuously admitted into the system and the spent earth is being continuously removed from the system at another point.

A still further object of the invention resides in introducing the clay, mixed with liquid oil, into the top of a scrubbing tower from which passes overhead a light hydrocarbon fraction in vaporous form, the method of operation being such that the reflux liquid mixed with clay or fuller's earth passes downwardly through the scrubbing tower in heat exchanging relation with and countercurrent flow to the ascending vapors, thereby scrubbing said vapors and removing therefrom heavier fractions which are entrained therein, the condensate from this scrubbing tower together with the clay or other treating material, being then circulated through a pipe line to a pipe still to secure the operation and advantages above set forth. The clay-bearing reflux liquid introduced into the scrubbing tower is preheated by contact with the oil vapors passing through said tower for the purpose of effecting economical heat transfer or preliminary heat treatment of the reflux stock and further, the scrubbing tower serves to release those vapors which require but light if any treatment with clay from the system ahead of the principal treating units.

By way of illustration and to more fully develop the construction and operation of the apparatus and process comprising the present invention, there has been illustrated in the accompanying drawing in diagrammatic form apparatus and a flow diagram by which one specific form of the invention may be considered in detail.

Referring more particularly to the drawing the numeral 1 designates a cracking still, converter, reaction chamber or distillation unit, whichever the case may be. In this connection it will be understood that the invention may be used in the purifying of vapors released from (1) a vapor phase converter or other high temperature unit for effecting the molecular decomposition of the oil while the latter is in the vapor phase; (2) the cracking still of a liquid phase converter; (3) the reaction chamber or expander of a liquid phase converting system; or (4) a pipe still, a shell still or other source of hydrocarbon vapor supply. In all of these operations vapors may be produced containing undesirable compounds. In vapor phase systems of conversion this is particularly true, wherein the released vapors must be treated to remove therefrom gums, color, odor producing and other compounds which require elimination before the end product can be commercially distributed. While a cracked vapor phase distillate especially needs treatment, distillates obtained from liquid phase cracking systems also require similar treatment and in many instances vapors from distillation units wherein no conversion or cracking of the oil under treatment takes place.

From the unit 1 vapors which are generated therein pass by a pipe 2 to an evaporator 3. The materials which are unvaporized in the unit or which condense in the evaporator collect as liquids in the bottom of said evaporator and are withdrawn by way of the line 4 preferably as fuel oil. The vapors remaining in the evaporator 3 pass overhead by way of the line 5, and enter a fractionating tower 6 of any suitable construction. In this tower the liquid condensate which accumulates in the bottom drum 7 thereof is withdrawn by way of a pipe line 8 and may, if desired, be employed as recycle stock or, in other words, may be recirculated through the unit or still 1 for additional heat treatment.

The vapors which are discharged from the top of the tower 6 are conducted by way of the pipe line 9 into the lower portion of a scrubbing tower 10. The top of this tower is provided with a line 11 by means of which liquid reflux oil commingled with fuller's earth, finely divided clay or diatomaceous earths are introduced into the top of the tower 10 for direct contact with the ascending vapors passing through said tower. The clay-bearing reflux oil descends through the tower 10 in countercurrent flow to the ascending vapors, thus removing from said vapors all high boiling point materials which may be entrained in said vapors. In addition, the vapors are subjected to direct contact to a limited degree with the clay-treating material in order to remove from the vapors the undesirable constituents which it may possess. These vapors pass overhead from the tower 10 by way of the pipe line 12 and may circulate through a condenser 13 and then to a storage tank 14 as a treated end product.

There collects in the bottom of the tower 10 a quantity of liquefied hydrocarbons, consisting of the reflux oil introduced by way of the line 11 and the heavier condensed oils obtained from the vapors flowing through the tower 10, which oils are mixed with the clay treating materials introduced by way of the line 11. These condensed oils and clay treating material pass from the tower 10 by way of a pipe line 15 in which is provided a control valve 16 and are led into a pump 17, in order that said oils, together with the thoroughly intermingled or commingled clays may be forced through a pipe line 18 leading to a coil bank 19 arranged within the setting of a pipe still 20. Through the medium of the pump 17 relatively high pressures are maintained on the oil under heat treatment in the pipe still. These pressures may be approximately 200 pounds per square inch and at the same time the oil within the pipe still is heated to a temperature of approximately 650° F. These temperatures and pressures have been found to be highly effective in securing proper reactions in the matter of effecting the polymerization of undesirable compounds. I have observed that the higher the temperature the greater is the efficiency of the treating material and for this reason I employ temperatures considerably higher than those utilized in prior processes. Even at the temperatures and pressures specified the oil thus undergoing treatment remains or is maintained in the vapor phase. I am aware of the fact that it has been proposed to keep the oil under treatment in the liquid phase by the use of high pressures and while in contact with the clay-treating material and then to suddenly release said pressures by permitting the oil to expand rapidly in an enlarged fractionating column or other enlarged chamber. In the present invention, however, while high temperatures and pressures are used no effort is made to maintain the oil in the liquid phase strictly, the pressures utilized being high enough to thoroughly impregnate the clay with the oil under treatment.

After circulating through the coil bank of the pipe still the oil is passed through a pipe line 21 provided with a pressure release valve 22, and thence into a fractionating tower 23, where the oil vapor may be maintained at a pressure slightly above atmospheric. The clay and the polymerized hydrocarbons in liquid form are collected in the bottom of the tower 23 and may be continuously removed therefrom by a pipe line 24, the lighter or desired fractions passing overhead from said fractionating tower 23 by way of a pipe line 24 to a condenser 25 to a storage tank 26. The liquefied hydrocarbons which are collected in the tank 26 are substantially free from compounds which tend to discolor the same or to produce gums or resinous substances therein. These oils may be used as motor fuels and may possess a water-white color, a satisfactory odor, good stability in color upon exposure to light or upon standing and possess a very low or practically negligible gum content.

In view of the foregoing it will be seen that by the provision of the present invention a process is provided where, first, from the high temperatures used during the treatment of the oils with clay a greatly accelerated catalytic action is secured which varies in direct ratio to the temperatures employed. Second, the high pressures used made it positive that the clay or other treating material be thoroughly impregnated with the oil under treatment and at the same time maximum surface action is secured, particularly in view of the fine mesh employed. Third, the high pressure provides for a longer time of contact in the heating zone which is necessary to insure completely the desired reactions. This time may vary in accordance with the character of the treating material and the charging stock used. Fourth, with the type of apparatus disclosed the time of reaction may be altered by increasing the pressure and/or securing it by providing more tubes in the pipe still 20, or tubes auxiliary to the pipe still. Fifth, a predetermined knowledge of what yield is going to be secured and also of the quality of the end product obtained from any given quantity of clay. This, of course, will vary with the quality of the clay and the temperature and pressures employed. Sixth, the temperatures employed to secure the reactions are sufficient so that when the reactions are complete on releasing the pressure and when the treated material is led into the fractionating tower 23 by controlling the tower in the customary manner any desired end-point distillate can be obtained. Seventh, a continuous process is provided with continuous removal of clay from the system. Eighth, the polymers formed are fractionated out in the fractionating tower and it is not necessary to resort to any solvent action to keep the clay free of gum in order to secure maximum efficiency.

What is claimed is:

1. A system for removing color-imparting and gum-forming compounds from hydrocarbon oils comprising a scrubber, means admitting of the introduction of heated oil vapors into the lower portion of said scrubber to permit of the flow of said vapors upwardly therethrough, there being a vapor outlet near the top of said scrubber, means for introducing a finely divided solid treating agent into the upper portion of said scrubber to cause said treating agent to pass through the scrubber in countercurrent relationship to the ascending vapors, a polymerizing still, a transfer line uniting the lower portion of said scrubber with said polymerizing still, a pump situated in said line for forcing the condensate and treating mixture from the bottom of said scrubber through said polymerizing still wherein said mixture is subjected to pressures and temperatures necessary to reduce the same to vaporous state without cracking while passing through the still, separating apparatus for receiving the vaporized mixture discharged from said still, and a valved connection between said polymerizing still and separating apparatus, said valve connection serving to remove the pressures on the products discharged from said still.

2. The method of removing color-imparting and gum-forming compounds from cracked petroleum distillates which consists in adding a finely divided solid treating agent capable of polymerizing gum-forming constituents in such distillates to the oil vapors passing through a fractionating zone, in removing from said zone a mixture consisting of a condensate of high boiling point oils obtained from said zone and said treating agent, in passing said mixture in a stream of restricted cross-sectional area through a heating zone wherein said mixture is subjected to super-atmospheric pressures at temperatures sufficiently elevated to normally vaporize said oils without material cracking of the same, and then passing said mixture into a separating zone at materially reduced pressures as compared with those prevailing in the heating zone in order to separate the desired low boiling point oils from the higher boiling point polymerized oils and the treating agent contained thereby.

3. In a system for removing color-imparting and gum-forming compounds from cracked hydrocarbon oils comprising a scrubber through which such oil in a vaporized state is passed and separated into vaporous and liquid fractions, means for introducing a clay bearing liquid reflux oil into said scrubber for direct contact with the oils and vapors contained therein, an outlet in said apparatus for the degummed vaporous fraction of said oil, a separate outlet for the heavier liquid fraction of said oil leading from said apparatus and through which said clay-containing heavy oils are discharged, a polymerizing heater, a pump for forcing the clay-containing oil under pressure through said heater whereby to vaporize said clay-containing oil without substantially cracking the same and to effect the polymerization of the undesired compounds contained therein, a separator formed to receive the vaporized and treated oils released from said heater to separate the desired gum-free low boiling oils from the undesired higher boiling polymerized oils, and a pressure reducing valve arranged between said heater and separator.

4. Apparatus for removing color-imparting and gum-forming compounds from cracked low boiling hydrocarbon oils, comprising a scrubbing tower having an inlet in the lower portion thereof through which oil vapor obtained without reheating from a cracking operation is admitted into the tower, means for introducing a solid finely divided treating agent into the upper portion of said tower to cause said treating agent to pass through the tower in countercurrent relation to the path of oil vapor therethrough, a vapor outlet leading from the upper portion of said tower to remove treated low boiling oils from the tower, a separate outlet in the lower portion of said tower for effecting the removal from said tower of higher boiling oils requiring additional degumming treatment and said treating agent, a polymerizing still, a pipe connection between the liquid outlet of said scrubbing tower and the inlet side of said still, a pump situated in said pipe connection and serving to force the oil-treating agent mixture through said still under pressures permitting of the vaporizing of the oil in said mixture during the passage thereof through the still, separating means adapted to receive the vaporized mixture from said still, and a pressure reducing means arranged between the still and said separating means.

5. The method of de-colorizing and degumming low boiling cracked petroleum oils which comprises fractionating a body of such oils while in a vaporized state to produce a low boiling vapor fraction and a higher boiling liquid fraction, adding a finely divided solid treating agent to the oils undergoing such fractionation to remove the undesirable compounds from the low boiling vaporous fraction, removing such treated vapors from the fractionating zone and separately removing from the zone the higher boiling liquid fraction requiring additional de-gumming treatment, subjecting the liquid fraction while admixed with said treating agent to superatmospheric pressures and vaporizing temperatures to polymerize undesirable constituents present therein, then discontinuing heating of said mixture and releasing the pressure thereon, and separating the treated de-gummed and de-colorized oils from the treating agent and the undesired oils.

6. The method of removing gum-forming and color-imparting bodies from low boiling cracked petroleum oils, which comprises vaporizing a body of such oils, contacting the oils while in a vaporized state with a finely divided solid treating agent whereby to remove objectionable bodies from the lower boiling point compounds of such vaporized oils, separately collecting the higher boiling point oils requiring additional de-gumming treatment, and passing such higher boiling point oils together with a solid finely divided treating agent through a polymerizing zone maintained under elevated conditions of temperature and pressure.

7. The method of removing gum-forming and color-imparting bodies from cracked low boiling petroleum oils which comprises passing a stream of such oils in a vaporized state without additional reheating from a cracking zone through a fractionating zone, bringing the oils while in said fractionating zone into contact with a finely divided solid treating agent, removing from said fractionating zone as vapors those oils requiring but mild treatment with said treating agent to remove objectionable constituents, separately removing from said fractionating zone higher boiling oils insufficiently treated in said fractionating zone to completely remove therefrom the objectionable constituents, and then passing said higher boiling point oils together with the treating agent through a polymerizing zone maintained under elevated conditions of temperature and pressure to complete the removal of the objectionable constituents from the oils.

In testimony whereof I affix my signature.

RUDOLPH C. OSTERSTROM.